US011205960B2

(12) United States Patent
Nii et al.

(10) Patent No.: US 11,205,960 B2
(45) Date of Patent: Dec. 21, 2021

(54) ELECTRONIC DEVICE WITH A MODULE USING POWER LINE COMMUNICATION

(71) Applicant: VIVITA JAPAN, INC., Fukuoka (JP)

(72) Inventors: Hideaki Nii, Fukuoka (JP); Shozaburo Shimada, Fukuoka (JP)

(73) Assignee: VIVIWARE JAPAN, INC., Fukuoka (JP)

( * ) Notice: Subject to any disclaimer, the term of this patent is extended or adjusted under 35 U.S.C. 154(b) by 0 days.

(21) Appl. No.: 17/254,588

(22) PCT Filed: Jun. 18, 2019

(86) PCT No.: PCT/JP2019/024092
§ 371 (c)(1),
(2) Date: Dec. 21, 2020

(87) PCT Pub. No.: WO2019/244886
PCT Pub. Date: Dec. 26, 2019

(65) Prior Publication Data
US 2021/0194361 A1    Jun. 24, 2021

(30) Foreign Application Priority Data

Jun. 20, 2018 (JP) .............................. JP2018-117366

(51) Int. Cl.
*H02M 3/156* (2006.01)
*H04B 3/54* (2006.01)
(52) U.S. Cl.
CPC .............. *H02M 3/156* (2013.01); *H04B 3/54* (2013.01)
(58) Field of Classification Search
None
See application file for complete search history.

(56) References Cited

U.S. PATENT DOCUMENTS

| 2012/0051757 A1 | 3/2012 | Nishino et al. |
| 2012/0176064 A1* | 7/2012 | Saes ............ H05B 45/37 |
| | | 315/297 |

(Continued)

FOREIGN PATENT DOCUMENTS

| CN | 102386976 A | 3/2012 |
| EP | 1681776 A1 | 7/2006 |

(Continued)

OTHER PUBLICATIONS

JPO Notice of Reasons for Rejection issued to JP Application No. 2020-519152, dated Aug. 4, 2020.

(Continued)

*Primary Examiner* — Jeffrey A Gblende
(74) *Attorney, Agent, or Firm* — Cantor Colburn LLP

(57) ABSTRACT

The present invention improves power supply efficiency during power line communication. This electronic device, comprising at least a portion of a constant current circuit connected to a predetermined load, has a circuit unit that controls the voltage to be applied to the predetermined load on the basis of a state related to the predetermined load. The circuit unit has: a path (a path from end to end via a constant voltage diode) in which at least a portion of the voltage to be applied to the predetermined load is generated when a constant current flowing in the constant current circuit flows therein; and a field effect transistor serving as a switch unit for switching between short-circuiting the path and undoing the same. A control unit controls the voltage to be applied to the predetermined load by switching the state of the switch unit.

5 Claims, 9 Drawing Sheets

(56) References Cited

U.S. PATENT DOCUMENTS

| | | | |
|---|---|---|---|
| 2014/0159586 A1 | 6/2014 | Kido | |
| 2015/0194881 A1* | 7/2015 | Wendt | H02M 1/08 |
| | | | 323/312 |
| 2015/0364993 A1* | 12/2015 | Wang | H05B 45/38 |
| | | | 323/282 |
| 2016/0330821 A1 | 11/2016 | Siessegger | |
| 2018/0199407 A1* | 7/2018 | Gotou | H05B 45/10 |

FOREIGN PATENT DOCUMENTS

| | | |
|---|---|---|
| EP | 3669957 A1 | 6/2020 |
| JP | 2003163090 A | 6/2003 |
| JP | 4648195 B2 | 3/2011 |
| JP | 2012069505 A | 4/2012 |
| JP | 2014135716 A | 7/2014 |
| JP | 2019033880 A | 3/2019 |
| WO | 9948304 A2 | 9/1999 |

OTHER PUBLICATIONS

International Search Report for International Application No. PCT/JP2019/024092; dated Aug. 27, 2019.
CNIPA First Office Action for corresponding CN Application No. 201980040685.3, dated Apr. 19, 2021.

\* cited by examiner

FIG. 6
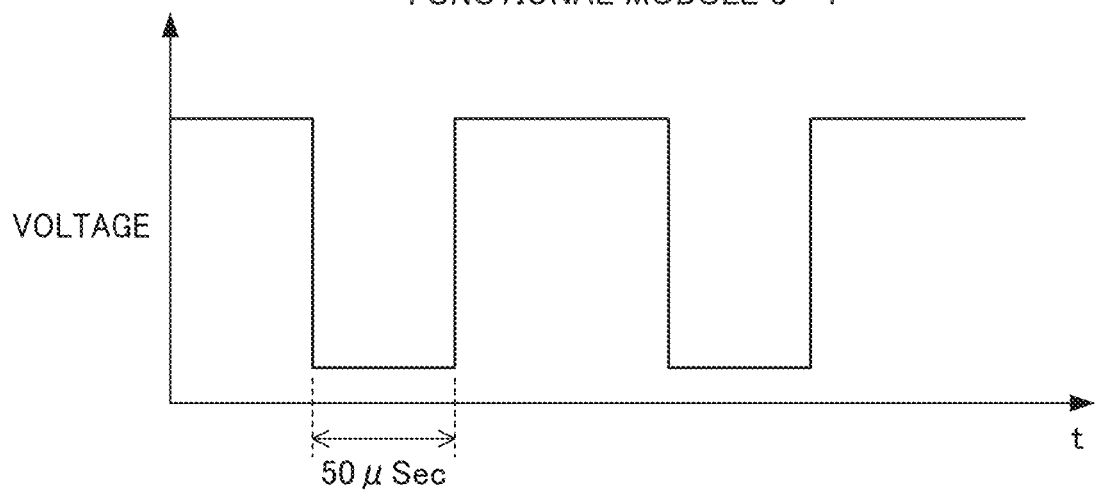
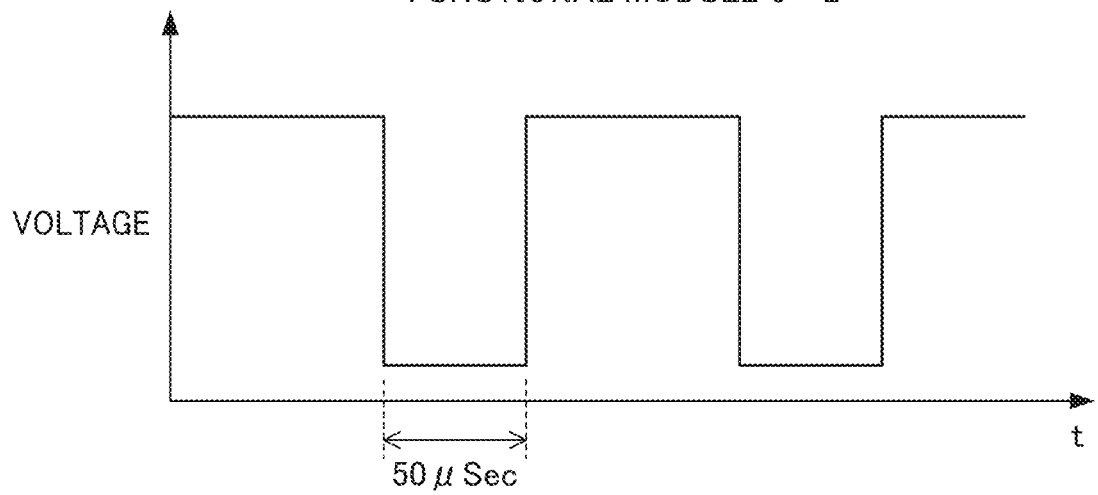

FIG. 7
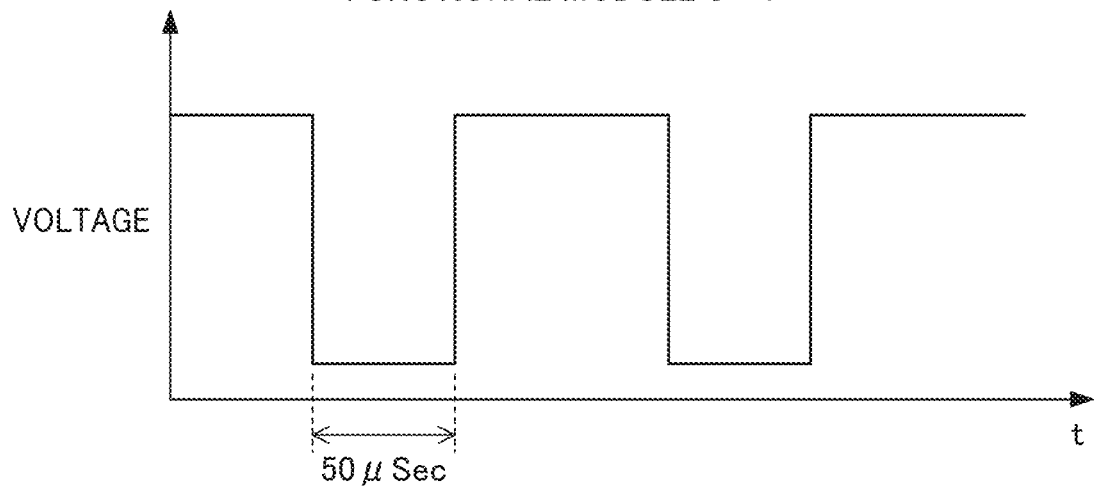
FUNCTIONAL MODULE 3-1
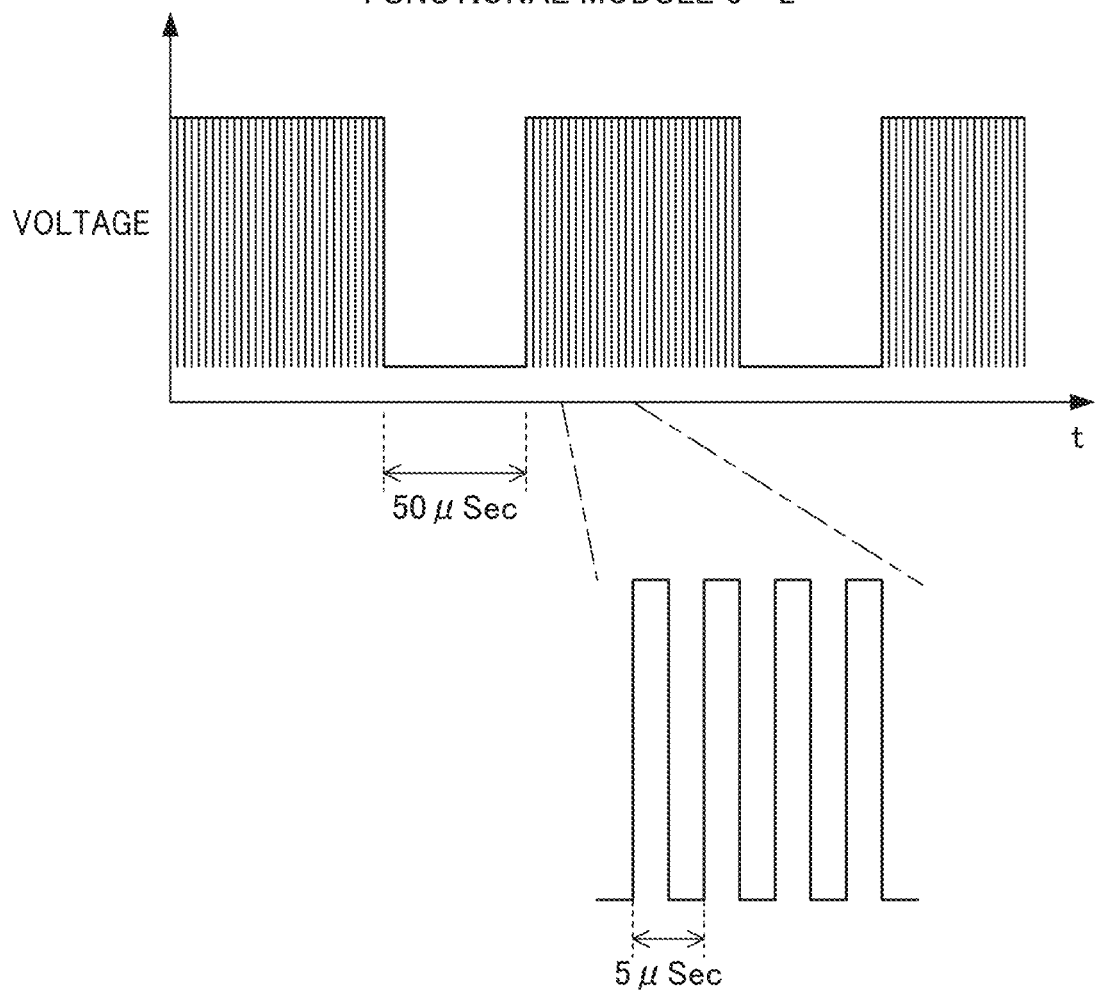
FUNCTIONAL MODULE 3-2

ELECTRONIC DEVICE WITH A MODULE USING POWER LINE COMMUNICATION

CROSS REFERENCE TO RELATED APPLICATIONS

This is the U.S. national stage of application No. PCT/JP2019/024092, filed on Jun. 18, 2019. Priority under 35 U.S.C. § 119(a) and 35 U.S.C. § 365(b) is claimed from Japanese Application No. 2018-117366, filed Jun. 20, 2018, the disclosure of which is also incorporated herein by reference.

TECHNICAL FIELD

The present invention relates to an electronic device.

BACKGROUND ART

Conventionally, there has been a technique for suppressing power supply by a constant current, for example, as disclosed in Patent Document 1. For example, according to the technique described in Patent Document 1, an LED lighting apparatus is provided in which a light emitting state is detected by a photodiode, and a constant current circuit is controlled in accordance with a detected value of the photodiode to control the current flowing through the light emitting diode. However, the applicant of the present application has developed an electronic device which performs communication using power line communication and receives power supply, and has filed a patent application as Japanese Patent Application No. 2017-156827.

Patent Document 1: Japanese Unexamined Patent Application, Publication No. 2003-163090

DISCLOSURE OF THE INVENTION

Problems to be Solved by the Invention

Improvement in power supply efficiency has been demanded when using power line communication. However, it is not possible to sufficiently satisfy such a demand simply by applying the conventional technique including the above-mentioned Patent Document 1.

Means for Solving the Problems

The present invention has been made in view of such a situation, and an object thereof is to improve power supply efficiency when performing power line communication.

In order to achieve the above object, an electronic device according to an aspect of the present invention, which has at least a portion of a constant current circuit network connected to a predetermined load, includes a control unit configured to control an applied voltage to the predetermined load based on a state relating to the predetermined load.

Effects of the Invention

According to the present invention, it is possible to improve power supply efficiency when performing power line communication.

BRIEF DESCRIPTION OF THE DRAWINGS

FIG. 6 is a diagram showing an example of a communication waveform when information is transmitted from the functional module to the core module;

FIG. 7 is a diagram showing an example of a waveform generated in accordance with the continuous switching of the state of a switch unit by the two-wire constant current communication circuit according to the first embodiment of the present invention;

PREFERRED MODE FOR CARRYING OUT THE INVENTION

First Embodiment

Embodiments of the present invention will be described below with reference to the drawings.

Figure 1:
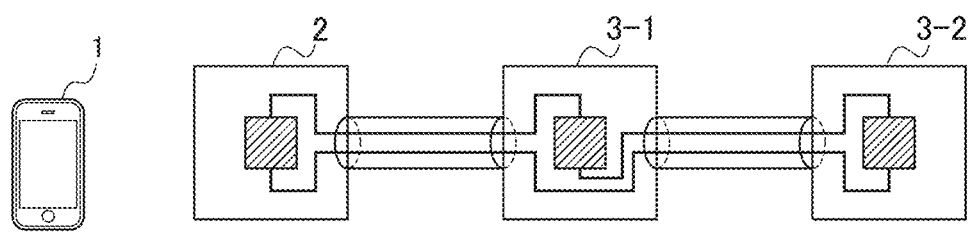
FIG. 1 is a block diagram showing a configuration of an information processing system according to a first embodiment of the present invention.

FIG. 1 is a block diagram showing a configuration of an information processing system according to a first embodiment of the present invention. The information processing system shown in FIG. 1 includes a user terminal 1 used by a user, a basic core 2, and a plurality of functional modules 3-1 to 3-n, where n is any integer value of 1 or more. It should be noted that, for each of the user terminal 1 and the basic core 2, only one is illustrated for convenience of explanation in the example of FIG. 1. However, the present invention is not particularly limited thereto, and it may be any number as long as pairing to be described later is possible. Furthermore, the number-n of functional modules 3-1 to 3-n connected to the basic core 2 is not particularly limited. For example, n may be 2 as in the example of FIG. 1, n may be 3 as in the example of FIG. 4 or FIG. 5, or n may be another integer value.

The user terminal 1 performs communication with the basic core 2 by various methods such as NFC (registered trademark) (Near Field Communication) and Bluetooth (registered trademark). It should be noted that, in the following, when it is not necessary to distinguish the functional modules 3-1 to 3-n individually, these are collectively referred to as "functional module 3".

In FIG. 1, a daisy chain type is exemplified as an example of a connection mode between the basic core 2 and the functional module 3. The daisy chain type shown in FIG. 1 is a so-called daisy chain connection mode in which the basic core 2 serves as one end, and one functional module 3-1 is connected to the one end, a functional module 3-2 is further connected to the functional module 3-1, and another functional module 3 (not shown) is further connected to the functional module 3-2.

Here, the basic core 2 and the functional module 3 used in the present embodiment will be briefly described. The basic core 2 is a hardware device for use in connection with one or more functional modules 3, and performs pairing with the user terminal 1 in short-range wireless communication (e.g., communication conforming to the standard of NFC (registered trademark)).

By performing pairing with a predetermined basic core 2-K (K is any integer value among 1 to m), the user terminal 1 recognizes the basic core 2-K and the L number of functional modules 3-K1 or 3-KL connected to the basic core 2-K (L is any integer value). In other words, a target to be connected with the basic core 2-K may be the serial connection of the L number of functional modules 3. The user terminal 1 can individually recognize each of the L number of functional modules 3. The functional module 3 is a hardware device configured by, for example, various sensors such as a temperature sensor, an operation device such as a push button, and a driving device such as a motor.

Here, the pairing of the user terminal 1 with the basic core 2-K described above will be described. In the present embodiment, when creating programs including at least the operation of the functional modules 3 connected to the basic core 2-K, it is necessary to perform pairing of the user terminal 1 with the basic core 2-K using the short-range wireless communication.

In short, pairing refers to causing the user terminal 1 to recognize the type, connection status, and the like of the basic core 2-K and the functional modules 3 connected to the basic core 2-K by using the short-range wireless communication. It should be noted that, when the user terminal 1 recognizes the type, the state of connection, and the like, of the functional module 3, an H-part corresponding to the connected functional module 3 is displayed on a program production screen. The user terminal 1 includes, for example, a tablet terminal.

Figure 2:
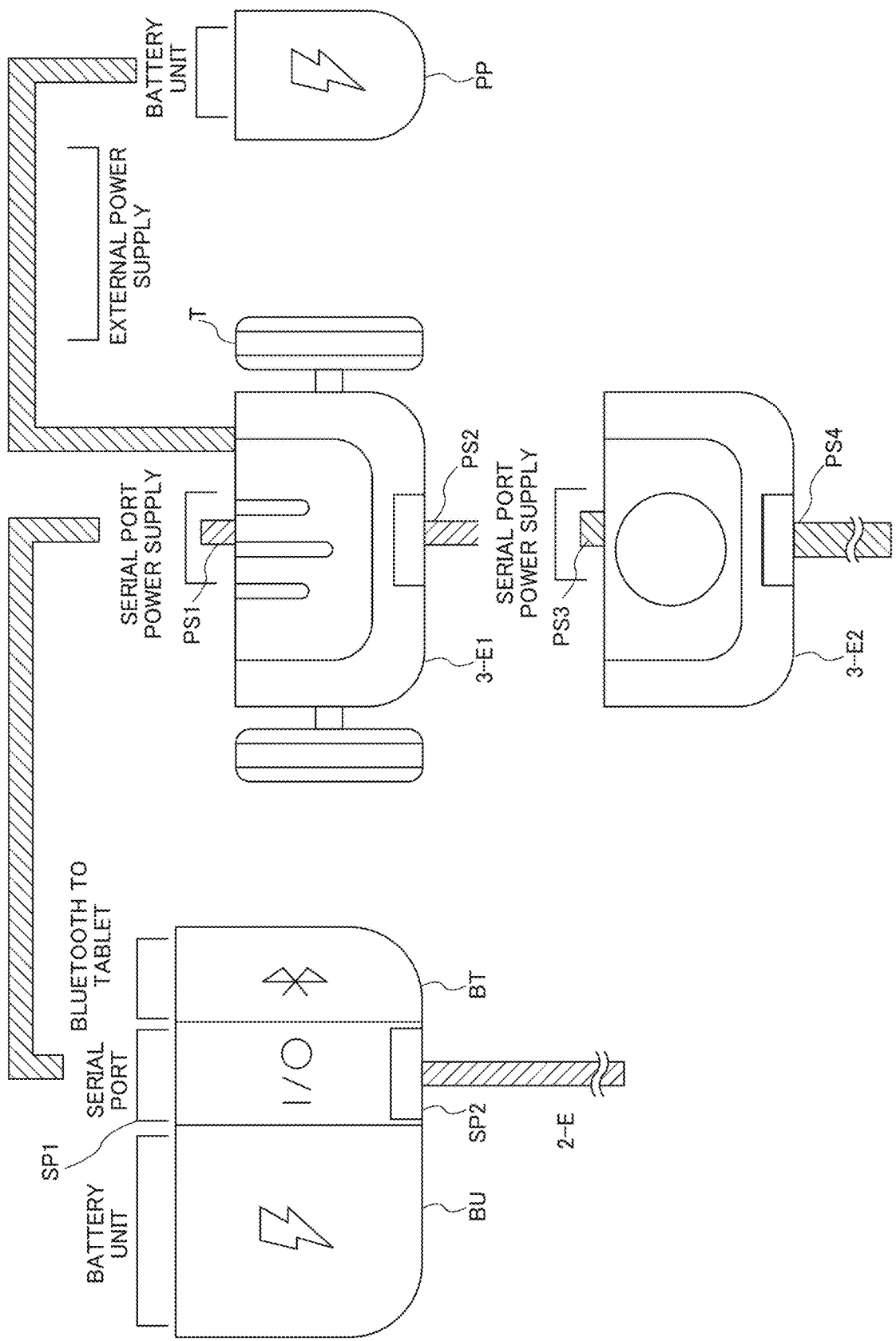
FIG. 2 is a diagram showing an example of a configuration in a state in which a basic core and a functional module according to the first embodiment of the present invention are connected.

Next, with reference to FIG. 2, a detailed explanation will be given of a connection form of a basic core 2-E (E is any integer value of 1 to m), a functional module 3-E1, and a functional module 3-E2 (E1 and E2 are each any integer value of 1 to n). FIG. 2 is a diagram showing an example of a configuration in a state in which the basic core and the functional module according to the first embodiment of the present invention are connected.

FIG. 2 illustrates the basic core 2-E, the functional module 3-E1, the functional module 3-E2, and a battery unit PP. The basic core 2-E is provided with a battery unit BU, a serial port SP1 and a SP2, and a short-range wireless communication unit BT.

The battery unit BU is, for example, a DC regulated power supply that supplies electricity with current to the basic core 2-E, the functional module 3-E1, and the functional module 3-E2. The serial ports SP1 and SP2 are each a connection (connection connector) for connecting the basic core 2-E to other hardware or the like.

In the example of FIG. 2, the basic core 2-E is provided with the serial ports SP1 and SP2, and the functional module 3-E1 is provided with the serial port PS1. Furthermore, the basic core 2-E and the functional module 3-E1 are connected via the two serial ports SP1 and PS1.

In addition, the functional module 3-E1 is provided with the serial port PS2 and the functional module 3-E2 is provided with the serial port PS3, and the functional module 3-E1 and the functional module 3-E2 are connected via the two serial ports PS2 and PS3. A plurality of modules may be connected to the serial port SP2 of the basic core 2-E in a loop shape through the functional module 3 located at the end connected in series from the serial port SP1 and the serial port thereof. The short-range wireless communication unit BT is equipped with an IC card or the like for performing short-range wireless communication with other hardware or the like by a method according to a predetermined standard (e.g., Bluetooth (registered trademark)).

In the case of FIG. 2, the user terminal 1 (not shown in FIG. 2) and the basic-core 2-E including the short-range wireless communication unit BT perform short-range wireless communication in a method according to Bluetooth (registered trademark). Specifically, for example, the execution result (command or the like) of the program produced by the user terminal 1 is also transmitted to the basic core 2-E.

Moreover, the basic core 2-E acquires the execution result (command or the like) of the program transmitted from the user terminal 1, superimposes the execution result on the current signal (for supplying power) as the transmission information, and transmits the execution result to the functional module 3, which is a target of the command or the like, of the functional module 3-E1 and 3-E2. Furthermore, the functional module 3-E1 is equipped with a tire T, and the functional module 3-E2 is equipped with a buzzer.

As described above, the functional modules 3-E1 and 3-E2 acquire only the execution result (command, etc.) of the program to the own machine among pieces of the transmission information transmitted from the basic core 2-E. The functional module 3-E1 shown in FIG. 2 drives the tire T in accordance with a command or the like for driving the tire among the execution results of programs (commands or the like) produced by the user terminal 1. The functional module 3-E2 sounds a buzzer in accordance with a command or the like for sounding a buzzer, among the execution results of programs (commands or the like) produced by the user terminal 1.

Here, in the example of FIG. 2, the battery unit PP is connected to the functional module 3-E1. The battery unit PP supplies power to the functional module 3-E1 as an external power supply, and also supplies power to the functional module 3-E2 or the like connected to the functional module 3-E1. It should be noted that, as described above, the battery unit PP is not an essential component if the power required for the functional module 3-E1 or the like can be supplied from the basic core 2.

The user terminal 1, the basic core 2, and the functional module 3 can execute program production processing in cooperation with various hardware and various software. Herein, program production processing refers to processing for creating a program for causing one or more of the functional modules 3 connected to the basic core 2 to function.

Herein, in the basic core 2 and the functional module 3 shown in FIGS. 1 and 2, the two-wire constant current communication circuit is formed. The two-wire constant current communication circuit is a circuit in which a signal current is superimposed on a constant current for power supply to omit wiring dedicated to communication, and the circuit is connected by only two wires used for power supply to perform current communication. As compared with a case of wiring the power supply line and the communication line separately, this method requires a smaller number of wires. Therefore, it is possible to make the cable finer when bundled into one, thereby allowing for easy wiring and requiring less connection connectors. Furthermore, unlike the voltage type communication system, in the current type communication system, the circuit does not become complicated even when realizing stable communication at long distance, and the cost or the substrate size does not increase. That is, according to this method, it is possible to realize an assembly block capable of stably performing data communication with a simple configuration.

However, in the two-wire constant current communication circuit, there is a problem in that the power supply efficiency is poor. As shown in FIG. 1, in the connection mode of the basic core 2 and the functional module 3, although the wiring does not constitute a closed loop in appearance, since the wiring is folded back in the basic core 2 or the functional module 3 located at the end, the configuration assumes a closed loop wiring electrically. In such a wiring configuration, since the functional modules 3 are connected with each other in a row electrically, the current flowing through all the functional modules 3 is the same. For this reason, it is necessary to design the system of the basic core 2 and the functional module 3 in accordance with the functional module 3 that uses the largest amount of current (for example, the functional module 3-1). Therefore, the functional module 3 (for example, the functional module 3-2) that does not use the current, will change the unused current to heat, a result of which the power supply efficiency is deteriorated. Therefore, there is a desire to increase the power supply efficiency, that is, to reduce the power consumption of the functional module 3.

Figure 3:
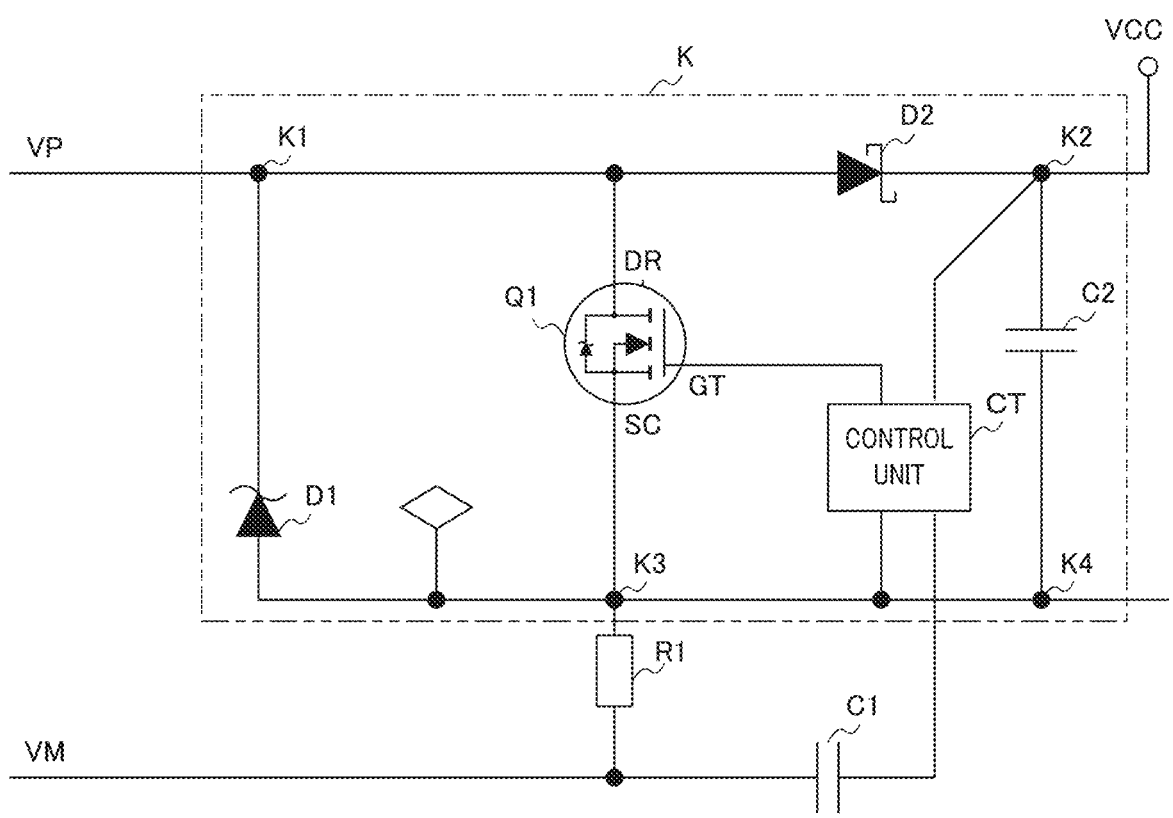
FIG. 3 is a circuit diagram showing an example of a two-wire constant current communication circuit according to the first embodiment of the present invention.

In order to meet such a request, the functional module of the present embodiment is provided with a circuit as shown in FIG. 3. FIG. 3 is a circuit connected to the two-wire constant current circuit network shown in FIG. 1, and is a circuit diagram showing an example of a circuit provided in one predetermined functional module, for example. The circuit of FIG. 3 is connected to the two-wire constant current circuit network using a constant current source (not shown) provided in the core module 2. The circuit of FIG. 3 is provided in the functional module 3.

In the circuit of FIG. 3, an input circuit positive terminal VP and an input circuit negative terminal VM are two-wire connection terminals, and connected to the constant current source provided in the core module 2. Herein, the connection refers to a broad concept including not only direct connection but also connection through other elements such as another functional module 3.

The circuit of FIG. 3 is configured to include a circuit portion K having an end K1 to an end K4, a current measuring resistor R1, and a capacitor C1. In the circuit portion K, the end K1 is connected to the input circuit positive terminal VP, and the end K3 is connected to one end of the current measuring resistor R1. The other end of the current measuring resistor R1 is connected to one end of the input circuit negative terminal VM and the capacitor C1, and the other end of the capacitor C1 is connected to the control unit CT in the circuit portion K. In the circuit portion K, a load (not shown) is connected to the end K2 of the potential Vcc and the end K4.

The circuit portion K includes a constant voltage diode D1, a field effect transistor Q1, a Schottky barrier diode D2, a capacitor C2, and a control unit CT. In the circuit portion K, the constant voltage diode D1, the field effect transistor Q1, and the parallel connection of the Schottky barrier diode D2 and the capacitor C2 are connected in parallel between the end K1 and the end K4. The end K2 is provided as a connection end of the Schottky barrier diode D2 and the capacitor C2, and the ends K3 and K4 are connected at the same potential.

The control unit CT has its output which is connected to a gate GT of the field effect transistor Q1, and has its input which is connected to the end K2 of the potential Vcc. The control unit CT is also connected to the capacitor C1 and to the end K4 (the end K3), as described above. The source SC of the field effect transistor Q1 is connected to the end K3, and a drain DR of the field effect transistor Q1 is connected to the end K1.

Next, the operation of the circuit of FIG. 3 having such a configuration will be described. As described above, the control unit CT switches the state of the field effect transistor Q1 as a switching element from one of the ON state and the OFF state to the other in accordance with the value of the potential Vcc to be inputted. That is, in the circuit of FIG. 3 in a standby state in which a load is not operated, when the potential Vcc is higher than a prescribed voltage, the control unit CT controls to turn the field effect transistor Q1 to the ON state. Thus, the resistance value between the drain DR-source SC becomes substantially zero, and short-circuits the circuit K, a result of which the constant voltage diode D1 is no longer energized. Thus, heat generation from the constant voltage diode D1 is avoided, and the power consumption of the functional module 3 including the circuit of FIG. 3 is significantly reduced.

On the other hand, in the circuit of FIG. 3 in the operating state in which the load is operated, when the potential Vcc becomes lower than the prescribed voltage, the control unit CT controls to turn the field effect transistor Q1 to the OFF state. Thus, a substantially insulated state is set between the drain DR and the source SC, and a constant current is supplied to the constant voltage diode D1 from the outside, a result of which sufficient voltage required for operation of the load is acquired. Therefore, the power consumption in this case is equal to the conventional case without using the circuit of FIG. 3.

With such a configuration, while the power required for the load is sufficiently supplied from the outside to the circuit of FIG. 3 in the operating state, the power consumption is significantly suppressed in the standby state.

Here, the power saving effect is exhibited higher with the field effect transistor Q1 having lower on-resistance. As a specific example of such a field effect transistor for a load switch, it is possible to employ a silicon N-channel MOS-type field effect transistor.

Hereinafter, the effect when the circuit of FIG. 3 is applied will be more specifically exemplified. It is assumed that a constant current of 20 mA flows between the input circuit positive terminal VP and the input circuit negative terminal VM. In this circumstance, it is assumed that the constant voltage diode D1 is applied a voltage of 3.5 V, and the current measuring resistor R1 is applied a voltage of 0.2 V. That is, in this situation, the circuit consumes:

$$(3.5+0.2) [V] \times 20 [mA] = 74 [mW].$$

In this situation, when the field effect transistor Q1 is turned ON by the control of the control unit CT, since the power consumption of the circuit is only the current measuring resistor R1, 0.2 [V]×20 [mA]=4 [mw]. That is, power consumption is significantly suppressed.

However, in the switching of the ON state/OFF state by the field effect transistor Q1 in the two-wire constant current communication circuit described above, there is a problem in that noise similar to the waveform at the time of communication is generated, which causes interference in communication with the own functional module 3 or another functional module 3. This interference raises a problem because a closed loop is configured and wiring is set in series even when the functional module 3 performing communication and the functional module 3 performing the switching of the ON state/OFF state by the field effect transistor Q1 differ from each other.

In order to solve such a problem, it is possible for the control unit CT of the circuit of FIG. 3 described above to perform the control described below with reference to the drawings. FIG. 6 is a diagram showing an example of a communication waveform when information for communication is transmitted from the functional module 3-1 to the core module 2. In the example of FIG. 6, it is assumed that the core module 2, the functional module 3-1, and the functional module 3-2 constitute a closed loop and are wired in series. In the upper part of FIG. 6, the horizontal axis represents time, and the vertical axis represents the voltage between the input circuit positive terminal VP and the input circuit negative terminal VM applied in the functional module 3-1. When information for communication is transmitted from the functional module 3-1 to the core module 2, the waveform of the voltage applied in the functional module 3-1 is shown by the upper part of FIG. 6 as a communication waveform. In the lower part of FIG. 6, the horizontal axis represents time, the vertical axis represents the voltage between the input circuit positive terminal VP and the input circuit negative terminal VM to be applied in the functional module 3-2. The functional module 3-2 is a functional module 3 for which other measures to be described later are not taken, and the waveform of the voltage to be applied in the functional module 3-2 is shown by the lower part of FIG. 6 in a case in which switching of the state of the field effect transistor Q1 continuously occurs in response to a change in the potential Vcc. Here, it is assumed that, in the horizontal axis of the upper and lower two figures, each time corresponds in the upper and lower parts, and thus, it is possible to compare the voltages at the same timing in the upper and lower parts. However, the core module 2, the functional module 3-1, and the functional module 3-2 constitute a closed loop and are wired in series. For this reason, the current between the input circuit positive terminal VP and the input circuit negative terminal VM of the actual modules becomes the same, and the voltage obtained by adding the voltage shown in the upper part of FIG. 6 and the voltage shown in the lower part of FIG. 6 together is applied to the core module 2.

Here, the information for communication is information composed of a combination of bits of "1" or "0". The information for communication is transmitted from the functional module 3 to the core module 2 as a signal of the pulse waveform shown in FIG. 6 having a high-level voltage indicating "0" and a low-level voltage indicating "1". In the example of the upper part of FIG. 6, the width of the pulse corresponding to the information for communication (portion which is a voltage of the low level indicating "1") is about 50 microseconds. Here, if the voltage for about 50 microseconds is at a low level, together with a portion of about 50 microseconds of the portion of the high level of any length before and after that, it can be said that about 100 microseconds is one cycle of one pulse. That is, the frequency of the communication waveform shown in the upper part of FIG. 6 (pulse waveform) is about 10 KHz.

On the other hand, if no other measure is taken, the switching of the state of the field effect transistor Q1 occurs continuously in accordance with the change of the potential Vcc, regardless of the fact that the signal of the communication waveform (pulse waveform) shown in the upper part of FIG. 6 is transmitted from the functional module 3 to the core module 2. The switching of the state of the field effect transistor Q1 independent of the communication from the functional module 3 to the core module 2 may occur continuously at a frequency of about 10 KHz, as shown in the lower row of FIG. 6. In this case, due to the continuous switching of the state of the field effect transistor Q1, the waveform of the voltage between the input circuit positive terminal VP and the input circuit negative terminal VM becomes similar to the waveform of the voltage in a case in which the communication waveform (pulse waveform) shown in the upper part of FIG. 6 is superimposed. Therefore, as a result of the continuous switching of the state of such a field effect transistor Q1, as shown in the lower part of FIG. 6, noise, which can easily be mistaken for a pulse wave of the information for communication in the core module 2 which is a transmission destination of the information for communication, is generated in functional module 3-2.

Therefore, as a countermeasure for the occurrence of such noise, for the time of a high-level voltage, the state of the field effect transistor Q1 is controlled so as to perform switching continuously at a high frequency, as shown in the lower part of FIG. 7. FIG. 7 is a diagram showing an example of a waveform generated in accordance with the continuous switching of the state of the switch unit by the two-wire constant current communication circuit according to the first embodiment of the present invention. In the example of FIG. 7 as well, similarly to FIG. 6, it is assumed that the core module 2, the functional module 3-1, and the functional module 3-2 constitute a closed loop, and are wired in series. The upper part of FIG. 7 is similar to the upper part of FIG. 6. That is, in the upper part of FIG. 7, the horizontal axis represents time, and the vertical axis represents the voltage between the input circuit positive terminal VP and the input circuit negative terminal VM to be applied in the functional module 3-1. When information for communication is transmitted from the functional module 3-1 to the core module 2, the waveform of the voltage applied in the functional module 3-1 is shown in the upper row of FIG. 7 as a communication waveform. In the lower part of FIG. 7, the horizontal axis represents time, and the vertical axis represents the voltage between the input circuit positive terminal VP and the input circuit negative terminal VM to be applied in the functional module 3-2. Here, similarly to FIG. 6, it is assumed that, in the horizontal axis of the upper and lower two figures, each time corresponds in the upper and lower parts, and thus, it is possible to compare the voltages at the same timing in the upper and lower parts. However, similarly to FIG. 6, the core module 2, the functional module 3-1 and the functional module 3-2 constitute a closed loop and are wired in series. For this reason, similarly to FIG. 6, the current between the input circuit positive terminal VP and the input circuit negative terminal VM of the actual modules becomes the same, and the voltage obtained by adding the voltage shown in the upper part of FIG. 7 and the voltage shown in the lower part of FIG. 7 together is applied to the core module 2. In the example of the lower part of FIG. 7, unlike the communication waveform (pulse waveform) shown in the upper stage of FIG. 7, for the time of a high-level voltage, the voltage is not sustained at a high level. That is, for the time of the high-level voltage, it is shown that the high level and the low level are repeated at a high frequency of about 200 KHz, and a pulse having a high voltage, that is, a narrow pulse, continues to appear with respect to the width on the time axis.

In the functional module 3-2, if the voltage between the input circuit positive terminal VP and the input circuit negative terminal VM changes as described above, it is possible to take measures against the generation of noise by, for example, applying a low-pass filter which allows only a signal having a frequency of 100 KHz or less to pass therethrough as a noise removing means. That is, for example, since a narrow pulse having a frequency of about 200 KHz does not pass through the low-pass filter, the waveform shown in the lower part of FIG. 7 is substantially unchanged after passing through the low-pass filter while remaining at the low-level voltage.

In contrast, the communication waveform shown in the upper stage of FIG. 7 is a frequency of about 10 KHz (pulse waveform) passes through the low-pass filter. Therefore, even if the narrow pulse shown in the lower part of FIG. 7 and the communication waveform (pulse waveform) shown in the upper part of FIG. 7 are mixed, only the communication waveform (pulse waveform) shown in the upper part of FIG. 7 can be extracted.

That is, even if the state of the field effect transistor Q1 is switched continuously in response to a variation in potential Vcc, according to the control of the control unit CT, if the supply of a high level of voltage is carried out by dividing into narrow pulses shown in the lower stage of a number of FIG. 7, these can be shut off with a low-pass filter. Thus, since there is no negative effect on the communication to the core module 2, and the reliability of the communication is improved, it is possible for the core module 2 to reliably control the functional module 3 based on the communication.

On the other hand, the high-level voltage is generated by the control unit CT controlling to turn the field effect transistor Q1 to the OFF state in order to restore the potential Vcc which has become lower than the prescribed voltage. Therefore, as described above, if the voltage is not sustained at the high level, the time required for restoring the potential Vcc is prolonged.

To address this, the control unit CT may determine the duty ratio for the narrow pulse shown in the lower part of FIG. 7 based on the power required for the operation of the load. That is, the control unit CT determines that, if the power required for the operation of the load is large, the time occupied by the high-level voltage in one cycle is lengthened, and the time occupied by the low-level voltage is shortened. Conversely, the control unit CT determines that, if the power required for the operation of the load is small, the time occupied by the high-level voltage in one cycle is shortened, and the time occupied by the low-level voltage is lengthened. Thereafter, the control unit CT controls to perform switching of the state of the field effect transistor Q1 in accordance with a timing at which the determined duty ratio is applied at a frequency of, for example, about 200 KHz. More specifically, for example, in a case in which the duty ratio is determined to be 0.4 by the control unit CT and is applied to the frequency of 200 KHz, in 5 microseconds which is one cycle, the time occupied by the high-level voltage is 2 microseconds, and the time occupied by the low-level voltage is 3 microseconds.

Second Embodiment

The first embodiment described above realizes the elimination of the adverse effect on the communication to the core module 2 by dividing the supply of high-level voltage into the plurality of narrow pulses shown in the lower part of FIG. 7. However, in order to eliminate the adverse effect on the communication to the core module 2, it is not necessarily required to divide the supply of high-level voltage into the plurality of narrow pulses shown in the lower part of FIG. 7. For example, by not switching the state of the field effect transistor Q1 as much as possible, it is possible to eliminate the adverse effect on the communication to the core module 2. That is, the second embodiment in which the state of the field effect transistor Q1 is not switched as much as possible may be adopted. By adopting this second embodiment, the control becomes simpler, and the power consumption associated with the switching of the state of the field effect transistor Q1 can be suppressed.

The system configuration of the second embodiment is the same as that of the first embodiment in FIG. 1. That is, an information processing system of the second embodiment also includes a user terminal 1 used by a user, a core module 2, and a plurality of functional modules 3. Since the configuration of the state in which the core module 2 and the functional module 3 are connected in the second embodiment is the same as that in the first embodiment shown in FIG. 2, a description thereof is omitted here.

Figure 8:
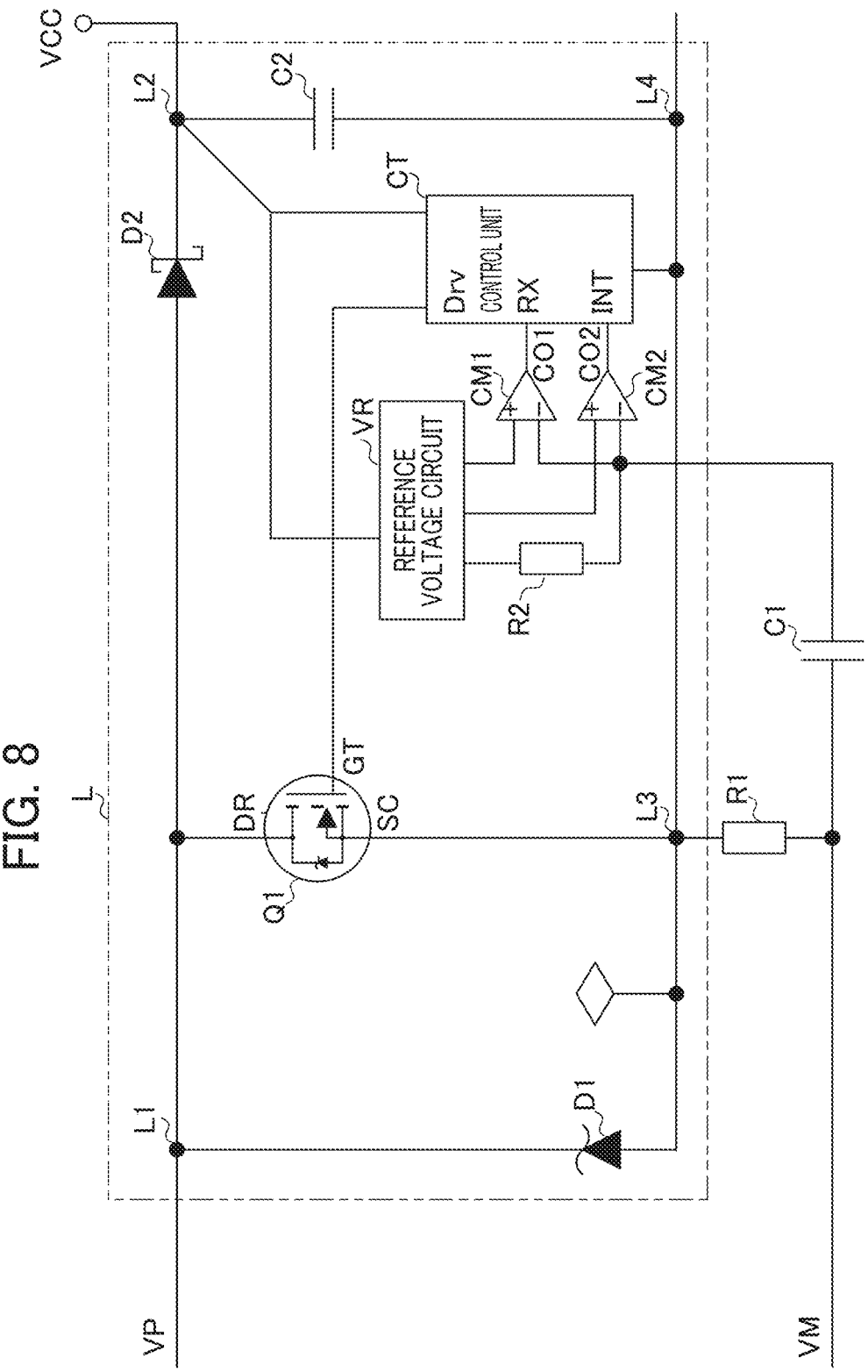
FIG. 8 is a circuit diagram showing an example of a two-wire constant current communication circuit according to a second embodiment of the present invention.

FIG. 8 is a circuit connected to two-wire constant current communication circuit network according to the second embodiment of the present invention, and is, for example, a circuit diagram showing an example of a circuit provided in a predetermined one functional module. The circuit of FIG. 8 is connected to a two-wire constant current circuit network using a constant current source (not shown) provided in the core module 2. The circuit shown in FIG. 8 is provided in each of the functional modules 3.

In the circuit of FIG. 8, an input circuit positive terminal VP and an input circuit negative terminal VM are two-wire connection terminals, and are connected to a constant current source provided in the core module 2.

The circuit of FIG. 8 is configured to include a circuit portion L having ends L1 to L4, a current measuring resistor R1, and a capacitor C1. In the circuit portion L, the end L1 is connected to the input circuit positive terminal VP, and the end L3 is connected to one end of the current measuring resistor R1. The other end of the current measuring resistor R1 is connected to one end of the input circuit negative terminal VM and the capacitor C1, and the other end of the capacitor C1 is connected to the negative terminal of a comparator CM1 in the circuit portion L, the negative terminal of a comparator CM2 and one end of a resistor R2 for current-level comparison. In the circuit portion L, a load (not shown) is connected to an end L2 of the potential Vcc and an end L4.

The circuit portion L has a constant voltage diode D1, a field effect transistor Q1, a Schottky barrier diode D2, a capacitor C2, a control unit CT, a reference voltage circuit VR, the resistor R2 for current-level comparison, the comparator CM1, and the comparator CM2. In the circuit portion L, the constant voltage diode D1, the field effect transistor Q1, and the Schottky barrier diode D2 and a capacitor C2 connected in series are connected in parallel between the end L1 and the end L4. As a connection end of the Schottky barrier diode D2 and a capacitor C2, an end L2 is provided, and an end L3 and the end L4 are connected at the same potential. Furthermore, the reference voltage circuit VR is also connected to the end L2. The other three ends of the reference voltage circuit VR are respectively connected to the resistor R2 for current-level comparison, the positive terminal of the comparator CM1, and the positive terminal of the comparator CM2, and an output terminal CO1 of the comparator CM1 is connected to an RX terminal of the control unit CT and an output terminal CO2 of the comparator CM2 is connected to an INT terminal of the control unit CT.

In the control unit CT, the output from the Dry terminal is connected to a gate GT of the field effect transistor Q1, and the input is connected to the end L2 of the potential Vcc. Furthermore, in the control unit CT, an RX terminal is connected to the output terminal CO1 of the comparator CM1, and an INT terminal is connected to the output terminal CO2 of the comparator CM2 and also connected to the end L4 (the end L3). A source SC of the field effect transistor Q1 is connected to the end L3, and a drain DR of the field effect transistor Q1 is connected to the end L1.

Here, since the constant voltage diode D1, the field effect transistor Q1, the Schottky barrier diode D2, and the capacitor C2 are the same as the first embodiment, descriptions thereof will be omitted here.

In the reference voltage circuit VR, the input is connected to the end L2 of the potential Vcc, and the respective three ends of the output side are connected to the resistor R2 for current-level comparison, the positive terminal of the comparator CM1, and the positive terminal of the comparator CM2. In the resistor R2 for current-level comparison, the other end is connected to the capacitor C1, the negative terminal of the comparator CM1, and the negative terminal of the comparator CM2. In the comparator CM1, the positive terminal is connected to one end of the resistor R2 for current-level comparison, the negative terminal is connected to one end of the input side of the reference voltage circuit VR, the capacitor C1, and the negative terminal of the comparator CM2, and the output terminal CO1 is connected to the RX terminal of the control unit CT. In the comparator CM2, the positive terminal is connected to the resistor R2 for current-level comparison, the negative terminal is connected to one end of the input side of the reference voltage circuit VR, the capacitor C1, and the negative terminal of the comparator CM2, and the output terminal CO2 is connected to the INT terminal of the control unit CT.

Next, the operation of the circuit of FIG. 8 having such a configuration will be described. It should be noted that the description of points overlapping with the operation of the circuit of FIG. 3 will be omitted as appropriate. The reference voltage circuit VR supplies a voltage as a reference for comparing the level of the current to the resistor R2 for current-level comparison, the comparator CM1 and the comparator CM2. That is, the reference voltage circuit VR supplies a voltage as a reference for comparison between the level of current and a first threshold value to the comparator CM1, to thereby enable comparison with the voltage generated at both ends of the current measuring resistor R1 in accordance with the level of current. Here, the first threshold value is a threshold value for the level of current, and a threshold value for obtaining bit information of 1 or 0 from the current. That is, the bit information takes the value of 1 if the voltage corresponding to the level of current is lower than the voltage corresponding to the first threshold value, and the bit information takes the value of 0 if the voltage corresponding to the level of current is higher than the voltage corresponding to the first threshold value. Furthermore, the reference voltage circuit VR supplies a voltage as a reference for comparison between the level of current and a second threshold value to the comparator CM2, to thereby enable comparison with the voltage generated at both ends of the current measuring resistor R1 in accordance with the level of current. That is, the second threshold value is a threshold value for detecting a signal to notify the start of communication from the current. For example, when a voltage of, for example, 1.5 to 1.8 V appears at the output of the capacitor C1 for the voltage at the end L3, the reference voltage circuit VR supplies a voltage of 1.5 V to the resistor R2 for current-level comparison, a voltage of 1.6 V to the positive electrode of the comparator CM1, and a voltage of 1.7 V to the positive electrode of the comparator CM2.

The comparator CM1 compares the level of current from the capacitor C1 and the first threshold value by a voltage corresponding to each of them, and if the level of current from the capacitor C1 exceeds the first threshold value, the comparator CM1 outputs the signal of 0 from the output terminal CO1 to the RX terminal of the control unit CT. The signal indicates a bit value of 0. Furthermore, the comparator CM1 compares the level of current from the capacitor C1 and the first threshold value by a voltage corresponding to each of them, and if the level of current from the capacitor C1 does not exceed the first threshold value, the comparator CM1 outputs the signal of 1 from the output terminal CO1 to the RX terminal of the control unit CT. This signal indicates a bit value of 1. That is, the comparator CM1 is a comparator for decoding information for communication from the current. It should be noted that, when the transmission of information from the core module 2 ends, the signal of 1 is continuously outputted to the RX terminal of the control unit CT from the output terminal CO1. Therefore, when such a state continues for a predetermined period of time after the input of the signal of 0 to the RX terminal is eliminated, the control unit CT may recognize that the transmission of information has ended.

The comparator CM2 compares the level of current from the capacitor C1 and the second threshold value, and if the level of current from the capacitor C1 exceeds the second threshold value, the comparator CM2 outputs the signal of 0 from the output terminal CO2 to the INT terminal of the control unit CT. The signal indicates the start of communication. Furthermore, the comparator CM2 compares the level of current from the capacitor C1 and the second threshold value, and if the level of current from the capacitor C1 does not exceed the second threshold value, the comparator CM2 outputs the signal of 1 from the output terminal CO2 to the INT terminal of the control unit CT. This signal is a signal that is not particularly meaningful. That is, the comparator CM2 is a comparator for detecting a signal notifying the start of transmission of the information for communication from the core module 2 to the functional module 3, from the current by the corresponding voltage.

As described above, the control unit CT switches the state of the field effect transistor Q1 as a switching element from one to the other between the ON state and the OFF state in response to the value of the potential Vcc to be inputted, the signal of 1 or 0 from the comparator CM1, or the signal of 1 or 0 from the comparator CM2. That is, similarly to the first embodiment, in the circuit of FIG. 8 in the standby state in which the load is not operated, when the potential Vcc is higher than a prescribed voltage, the control unit CT controls to turn the field effect transistor Q1 to the ON state. Thus, the resistance value between the drain DR and the source SC becomes substantially zero, and the circuit L is short-circuited, a result of which the constant voltage diode D1 is no longer energized. Thus, heat generation from the constant voltage diode D1 is avoided, and the power consumption of the functional module 3 including the circuit of FIG. 8 will be significantly reduced.

Furthermore, similar to the first embodiment, in the circuit of FIG. 8 in the operating state in which the load is operated, when the potential Vcc becomes lower than the prescribed voltage, the control unit CT controls to turn the field effect transistor Q1 to the OFF state. Thus, a substantially insulated state is set between the drain DR and the source SC, and a constant current is supplied to the constant voltage diode D1 from the outside, a result of which sufficient voltage required for operation of the load is acquired. Therefore, the power consumption in this case is equal to the conventional case without using the circuit of FIG. 8.

The control unit CT recognizes at least a part of the information for communication transmitted from the core module 2 based on the signal of 1 or 0 from the comparator CM1. For example, the control unit CT may recognize information that can identify the functional module 3 as a destination, information of the bit length of the information for the communication, and the like, from the information for communication. As a result, the control unit CT can recognize whether or not the information for communication has been transmitted to the own functional module 3. As a result, the control unit CT can recognize that the communication ends at the time when the transmission of the bit length of the information for communication is performed. It should be noted that the bit length of the information for communication may be a fixed length. In this case, even if the bit length information of the information for communication is not included, it is possible to recognize that the communication has ended at the time the transmission of the fixed length is performed.

Next, a sleep state to be introduced in the second embodiment will be described. The sleep state refers to a state in which control by the control unit CT to restore the potential Vcc to a prescribed voltage is made to sleep until the communication from the core module 2 to the own functional module 3 or another functional module 3 is started, and switching between the ON state and the OFF state of the field effect transistor Q1 is not induced during the sleep state. That is, even when the functional module 3 is in a standby state in which the load is not operated, the potential Vcc gradually decreases. Therefore, when it reaches a state lower than the prescribed voltage, in the circuit of FIG. 3, the control unit CT controls to turn the field effect transistor Q1 to the OFF state. Therefore, even when the functional module 3 is in a standby state in which the load is not operated, the control unit CT controls to turn the field effect transistor Q1 between the ON state and the OFF state repetitively, and a similar waveform as the communication waveform (pulse waveform) shown in FIG. 6 is generated each time the control unit CT controls to turn. This causes malfunction. However, even if the potential Vcc reaches a state lower than the prescribed voltage, the control unit CT does not immediately turn the field effect transistor Q1 to the OFF state, and the supply of power to the load is still possible even after the field effect transistor Q1 is turned to the OFF state when the communication from the core module 2 to the own functional module 3 or another functional module 3 is started. Therefore, it is sufficient as a functional module 3.

Therefore, it is considered that the control by the control unit CT to restore the potential Vcc to the prescribed voltage is made to sleep until the communication from the core module 2 to the own functional module 3 or another functional module 3 is started, and the switching of the field effect transistor Q1 between the ON state and the OFF state is avoided during the sleep state. Furthermore, it is considered that the field effect transistor Q1 is maintained in the OFF state until the communication between the core module 2 and the own functional module 3 or another functional module 3 ends, and the switching to the ON state is enabled after the communication ends. With such a configuration, the occurrence of a change in voltage due to the switching of the state of the field effect transistor Q1, which is noise when the information for communication is transmitted from another functional module 3 to the core module 2, is avoided. This eliminates the adverse effect on the communication to the core module 2, and improves the reliability of the communication, a result of which it is possible for the core module 2 to reliably control another functional module 3 including the circuit of FIG. 8 based on the communication.

In the functional module 3, when a signal notifying the start of transmission of the information for communication from the core module 2 by the comparator CM2 is detected, it is possible for the control unit CT to switch the field effect transistor Q1 from the ON state to the OFF state. Therefore, the amount of generation of the change in voltage due to the switching of the state of the field effect transistor Q1, which is noise when the information for communication is transmitted from another functional module 3 to the core module 2 in this case, is equal to that in the case of the circuit of FIG. 3. In addition, the control unit CT switches the field effect transistor Q1 from the OFF state to the ON state when the functional module 3 recognizes the end of transmission of the information to another functional module 3 or recognizes the end of detection of the transmission of information by the comparator CM1. Then, the control unit CT causes the control by the control unit CT to restore the potential Vcc to the prescribed voltage to sleep until the communication from the core module 2 to the own functional module 3 or another functional module 3 is started. Furthermore, the field effect transistor Q1 is maintained in the OFF state until the communication between the core module 2 and the own functional module 3 or another functional module 3 ends, and the switching to the ON state is enabled after the communication ends. With such a configuration, the occurrence of a change in voltage due to the switching of the state of the field effect transistor Q1, which is noise when the information for communication is transmitted from another functional module 3 to the core module 2, is avoided during the communication. This eliminates the adverse effect on the communication to the core module 2, and improves the reliability of the communication, a result of which it is possible for the core module 2 to reliably control another functional module 3 including the circuit of FIG. 8 based on the communication.

Figure 9:
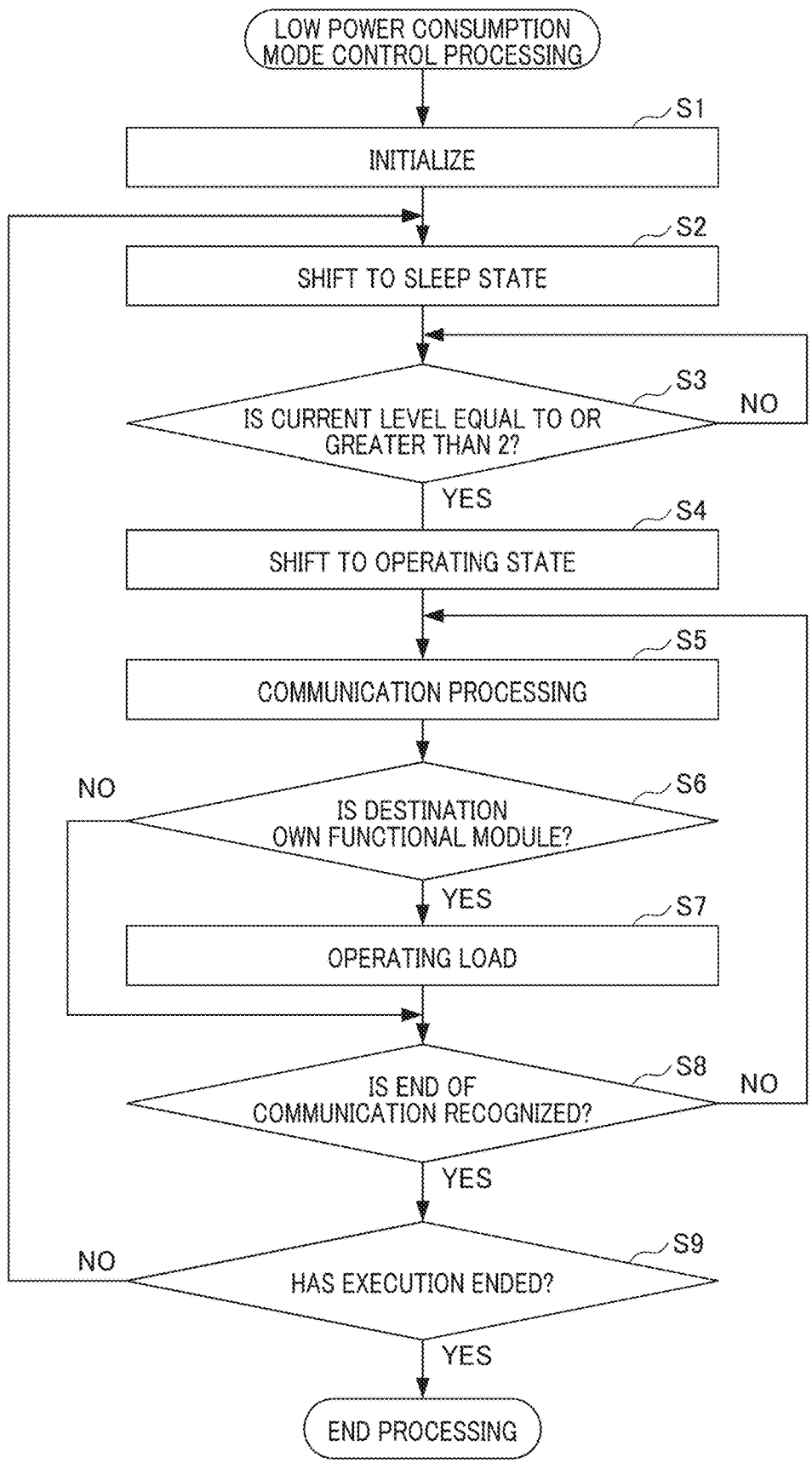
FIG. 9 is a flowchart for explaining a flow of low power consumption mode control processing executed by the two-wire constant current communication circuit according to the second embodiment of the present invention.

FIG. 9 is a flowchart showing a flow of low power consumption mode control processing executed by the two-wire constant current communication circuit according to the second embodiment of the present invention. In Step S1, the control unit CT performs initialization processing. Initialization processing refers to, for example, processing for initial recognition of individual core modules 2 and a plurality of functional modules 3 which is required for the communication between the core module 2 and the plurality of functional modules 3. In Step S2, the control unit CT shifts to the sleep state. That is, the control by the control unit CT to restore the potential Vcc to the prescribed voltage is made to sleep. In Step S3, the control unit CT determines whether the level of current flowing between the input circuit positive terminal VP and the input circuit negative terminal VM is equal to or greater than the second threshold value. If the level of current flowing between the input circuit positive terminal VP and the input circuit negative terminal VM is less than the second threshold value, in Step S3, it is determined as NO in Step S3, and the determination processing of Step S3 is repeated. If a current equal to or greater than the second threshold value is detected while the determination processing of Step S3 is repeated, it is determined as YES in the subsequent Step S3, and the processing advances to Step S4. In Step S4, the control unit CT ceases the sleep state, and shifts the state to a state of operating the recovery of the potential Vcc to the prescribed voltage. As a result, the communication processing by the control unit CT can be executed. In Step S5, the control unit CT performs communication processing. That is, in Step S5, the control unit CT reads the signal from the comparator CM1, and extracts at least the destination of the information. It should be noted that the length of the communication may be extracted. In Step S6, the control unit CT determines whether or not the destination of the information is the own functional module 3. If the destination of the information is different from the own module, it is determined as NO in Step S6, and the processing advances to Step S8. In Step S6, if the destination of the information is the own module, it is determined as YES, and the processing advances to Step S7. In Step S7, the control unit CT operates the load based on the result of the communication processing in Step S5, i.e., based on the control of the core module 2. In Step S8, the control unit CT determines whether the communication from the core module 2 to the own functional module 3 or another functional module 3 has ended. If the communication is mid way, it is determined as NO in Step S8, and the processing returns to the communication processing of Step S5 and the subsequent processing is repeated. In Step S8, if the communication ends, the control unit CT determines as YES, and the processing advances to Step S9. In Step S9, the control unit CT determines whether or not there is an end instruction of the low power consumption mode control processing. Here, the end instruction of the processing is not particularly limited; however, in the present embodiment, an end instruction of the processing from the core module 2 is adopted. That is, unless the end instruction of the processing is given from the core module 2, it is determined as NO in Step S9, and the processing returns to Step S2, and the subsequent processing is repeated. On the other hand, when the end instruction of the processing is issued from the core module 2, it is determined as YES in Step S9, and the low power consumption mode control processing ends.

Figure 10:
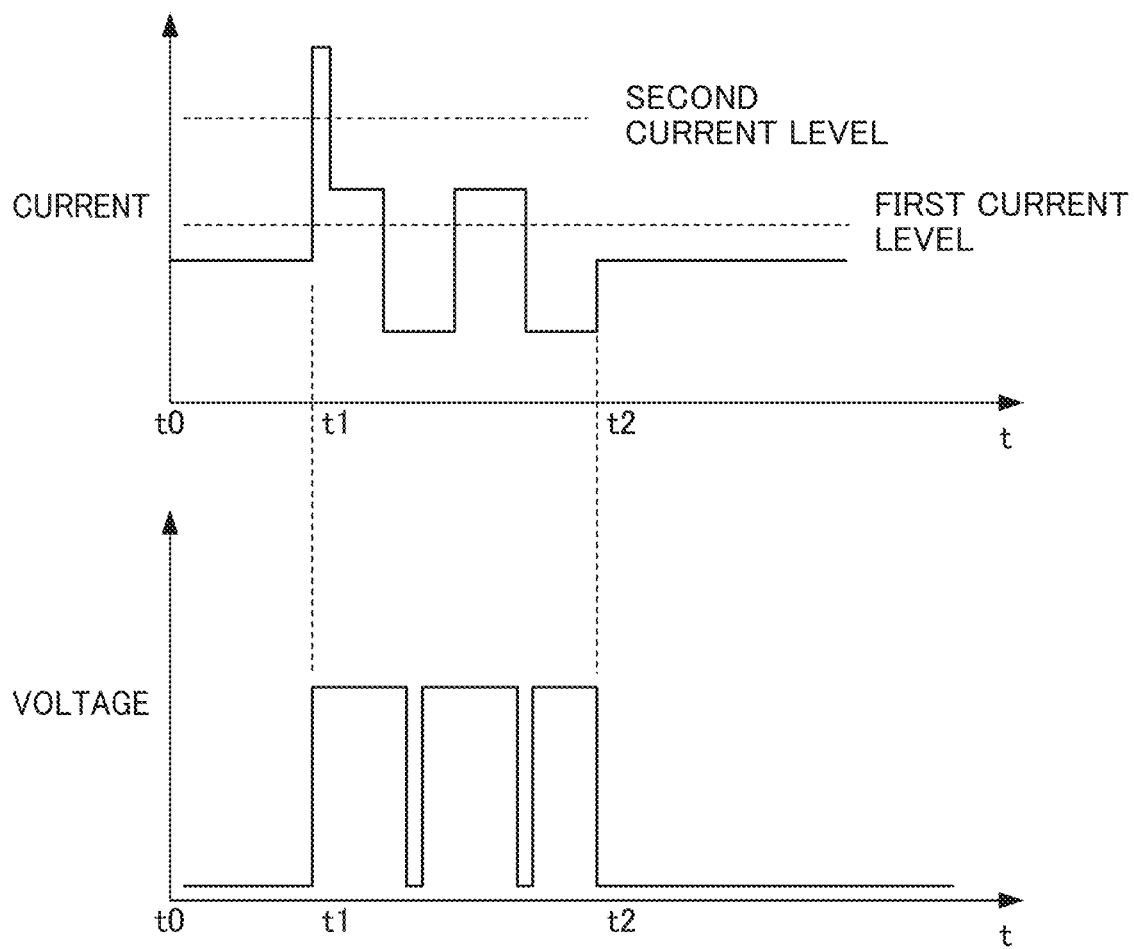
FIG. 10 is a diagram showing an example of a waveform by the two-wire constant current communication circuit according to the second embodiment of the present invention.

FIG. 10 is a diagram showing an example of a waveform by the two-wire constant current communication circuit according to the second embodiment of the present invention. In the upper part of FIG. 10, the horizontal axis represents time, and the vertical axis represents the current between the input circuit positive terminal VP and the input circuit negative terminal VM. When information for communication is transmitted from the core module 2 to the functional module 3, the waveform of the current superimposed on the constant current is shown in FIG. 10 as a communication waveform. In the lower part of FIG. 10, the horizontal axis represents time, and the vertical axis represents the voltage between the input circuit positive terminal VP and the input circuit negative terminal VM. When the information for communication is transmitted from the functional module 3 to the core module 2, the waveform of the voltage applied to the functional module 3 is as shown in FIG. 10. Here, it is assumed that, in the horizontal axis of the upper and lower two figures, each time corresponds in the upper and lower parts, and thus, it is possible to compare the currents and the voltages at the same timing in the upper and lower parts.

At time t0 in FIG. 10, the above-described low power consumption mode control processing is started, Steps 1 to 3 in FIG. 9 are sequentially executed, and then Step 3 is repeatedly executed.

At time t1 in FIG. 10, as a signal for notifying the start of transmission of information for communication from the core module 2, a pulse current of a level exceeding the second current level (second threshold value) is transmitted. As a result, at time t1 in FIG. 10, YES is determined in Step S3 in the low power consumption mode control process in FIG. 9, and the process proceeds to Step S5. At the timing at which Step S5 in FIG. 9 is executed after the elapse of time t1 in FIG. 10, the control unit CT performs communication processing. After time t1 in FIG. 10, as bit information indicating "0" in the information for communication from the core module 2, the pulse current of a level exceeding the first current level (first threshold value) is intermittently transmitted. After time t1 in FIG. 10, the pulse current of the level exceeding the first threshold value by the comparator CM1 is extracted as the information of 0, and the pulse current of the level not exceeding the first threshold value is extracted as the information of 1. Here, it is assumed that the control unit CT recognizes that the destination of the information for communication from the core module 2 is the own functional module 3. That is, at the timing at which Step S6 in FIG. 9 is executed, it is determined as YES, and the processing advances to Step S7. At the timing at which Step S7 in FIG. 9 is executed, the control unit CT operates the load in accordance with the information for communication from the core module 2 while transmitting the information for communication to the core module 2. Thus, in the own functional module 3, a voltage is applied between the input circuit positive terminal VP and the input circuit negative terminal VM.

At the timing at which Step S8 in FIG. 9 is executed after time t1 in FIG. 10, the control unit CT determines whether the communication has ended. Assuming that the communication continues until time t2, it is determined as NO at the timing of executing Step S8 in FIG. 9, and the processing returns to the communication processing of Step S5, and the subsequent processing is repeated. Each piece of the above processing is repeated until time t2.

At time t2 in FIG. 10, the communication with the core module 2 ends, and in Step S8 of FIG. 9, it is determined as YES, and the processing advances to Step S9 in FIG. 9. At time t2 in FIG. 10, in Step S9 of FIG. 9, the control unit CT determines that there is no end instruction of the low power consumption mode control processing, the processing returns to Step S2 in FIG. 9, and the subsequent processing is repeated.

While one embodiment of the present invention has been described above, the present invention is not limited to the above-described embodiments, and modifications, improvements, and the like within a scope achieving the object of the present invention are encompassed by the present invention. For example, a battery capable of supplying a stable direct current may be adopted. The current to be supplied is not limited to the direct current, and alternating current may be supplied by adopting various means such as inverters.

In an electronic device according to the present invention, power line communication may be introduced. With such a configuration, power supply and communication become possible with only two lines. Furthermore, with such a configuration, it is possible to build a simple circuit strong to noise. That is, the present invention can be applied to an electronic device capable of stabilizing data communication with a simple configuration.

In this case, a switching element provided for power line communication may also serve as the field effect transistor Q1 configuring the electronic device according to the present invention. With such a configuration, it is possible to suppress the number of components of a power circuit.

Furthermore, in this case, components for power supply voltage measurement configuring the electronic device according to the present invention may also serve as components built in a microcomputer for power line communication. With such a configuration, it is not necessary to add a comparator separately, and thus it is possible to curb the number of components.

It should be noted that, in this case, since the switching noise of the power saving mode is close to the waveform at the time of communication, it becomes interference noise to the communication. Therefore, a temporary invalidation means which separates communication and non-communication and does not switch ON/OFF at the time of communication may be added. This makes it possible to avoid interference with communication.

Furthermore, although the field effect transistor Q1 is employed in the above-described example, as can be understood from the operation of the above-described circuit, the present invention is not particularly limited thereto as long as it has a switching function. Furthermore, in the functional module 3, it is sufficient if the element for changing the resistance value is provided. This is because, if it is possible to suppress the voltage at the both ends of the functional module 3 by changing the resistance value, it is possible to suppress the power of the functional module 3.

Furthermore, in the above example, a case of the two-wire communication has been described; however, the present invention is not limited to this, and a power supply line and a communication line may be separately provided. In addition, the connection is not limited to a wired connection, and wireless power supply and communication may be combined.

Furthermore, for example, the number of the basic cores 2 and the number of the functional modules 3 are not particularly limited to the above-described embodiments. That is, the number of the basic cores 2 and the number of the functional modules 3 may be the same or different. That is, one functional module 3 may be connected to one basic core 2.

Figure 4:
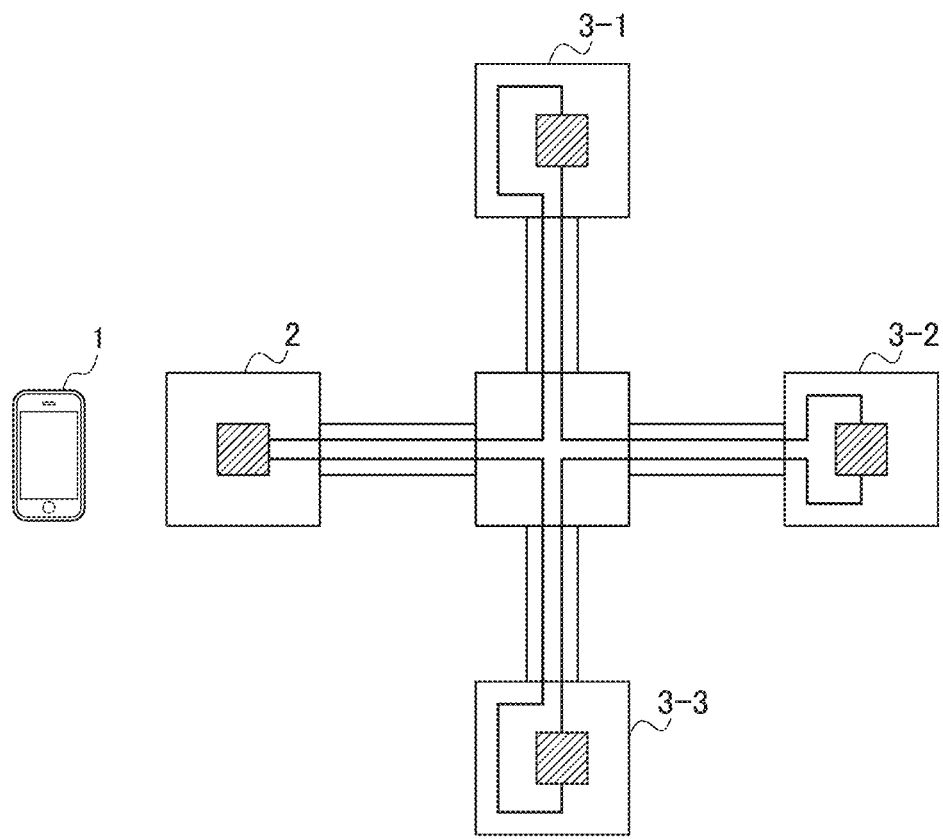
FIG. 4 is a block diagram showing a connection mode, which is different from FIG. 1, of the information processing system according to the first embodiment of the present invention.
Figure 5:
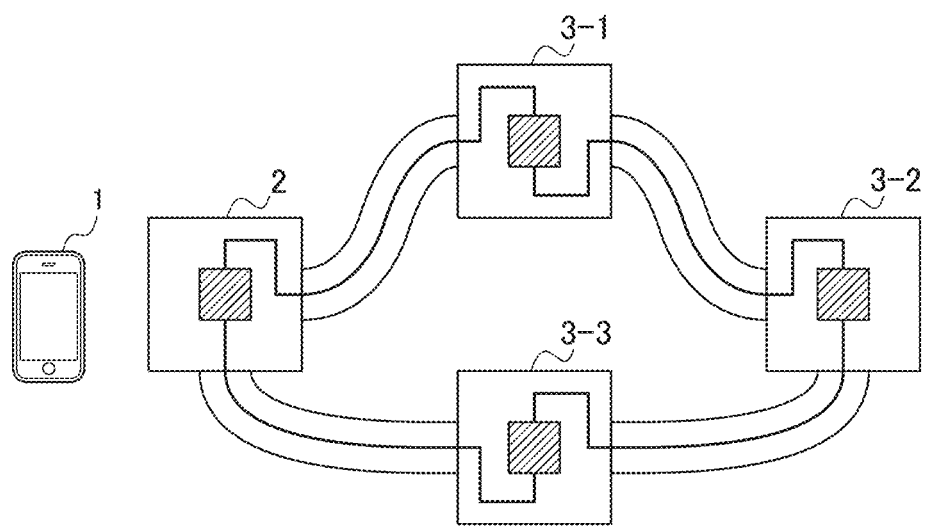
FIG. 5 is a diagram showing an example of a block showing a connection mode, which is different from FIG. 1 and FIG. 4, of the information processing system according to the first embodiment of the present invention.

More specifically, for example, the example shown in FIG. 4 or FIG. 5 may be adopted as another example of the connection mode between the basic core 2 and the functional module 3. In FIG. 4, a star type is exemplified as an example of the connection mode between the basic core 2 and the functional module 3. The star type shown in FIG. 4 is a connection mode in which the basic core 2 and two or more functional modules 3 (three functional modules 3-1 to 3-3 in the example of FIG. 4) are connected to the star type.

In FIG. 5, a loop type is exemplified as an example of the connection mode between the basic core 2 and the functional module 3. The loop type shown in FIG. 5 is a connection mode in which the basic core 2 and one or more functional modules 3 are connected in a predetermined order (in the example of FIG. 5, in the order of the basic core 2 and the functional modules 3-1 to 3-3) in a loop to form a closed loop.

In the daisy-chain type and star type, the wiring does not constitute a closed loop in appearance. However, since the wiring is folded back in the basic core 2 or the functional module 3 located at the end, the configuration assumes a closed loop wiring electrically. The connection mode is basically configured as the connection mode described above; however, if the configuration assumes a closed loop wiring electrically, it is possible to adopt any connection mode such as a connection mode made by combining the above connection modes.

Furthermore, it suffices if a signal transmitted from the basic core 2 to supply power to one or more functional modules 3 is in a form that can transmit power in a current system, and thus may be direct current or alternating current.

In the above description, the two-wire constant current communication circuit network is provided in the combination of the core module 2 and the functional module 3. However, the two-wire constant current communication circuit network is not limited to this, and the two-wire constant current communication circuit network may be provided, for example, in any combination made up of a module (master) having a constant current source and another module (slave).

In the example described above, the information for communication is transmitted from the functional module 3-1 to the core module 2, as a signal of the pulse waveform shown in FIG. 6 having a voltage of high level indicating "0" and a voltage of low level indicating "1". However, this is merely an example, and thus is not limitative. That is, the information of 0 or 1 may be a reverse combination in relation of high-level voltage and low-level voltage, the low-level voltage may indicate "0", and the high-level voltage may indicate "1".

Furthermore, in the example described above, the pulse current of the level exceeding the first threshold value by the comparator CM1 is extracted as the information of 1, and the pulse current of the level not exceeding the first threshold value is extracted as 0. However, this is merely an example, and thus is not limitative. That is, the information of 0 or 1 to be extracted may be an inverse combination in relation to whether exceeding the first threshold value or not, and the pulse current exceeding the first threshold value may be extracted as the information of 0, and the pulse current not exceeding the first threshold value may be extracted as the information of 1.

Furthermore, in the example of the above description, the second current level (second threshold value) is a higher current level (threshold value) than the first current level (first threshold value). However, this is merely an example, and thus is not limitative. That is, the second current level (second threshold value) may be the same current level (threshold value) as the first current level (first threshold value).

Furthermore, in the example described above, the time of the voltage of high level is controlled so as to continuously switch the state of the field effect transistor Q1 at high frequency. However, this is merely an example, and thus is not limitative. That is, the time of the voltage of low level may also be controlled to continuously switch the state of the field effect transistor Q1 at high frequency, as a configuration that can be short-cut including the current measuring resistor R1.

Furthermore, for example, the series of processing described above can be executed by hardware or software. That is, it suffices if the information processing system has a function capable of executing the above-described series of processing as a whole. Furthermore, one functional block may be configured by a single hardware unit, a single software unit, or a combination thereof.

Furthermore, for example, when a series of processing is executed by software, programs constituting the software are installed on a computer or the like from a network or a recording medium. The computer may be a computer embedded in dedicated hardware. Furthermore, the computer may be a computer capable of executing various functions by installing various programs, such as a general-purpose smartphone or a personal computer, in addition to the server.

Furthermore, for example, the recording medium including such a program is not only configured by a removable medium (not shown) which is distributed separately from a device main body in order to provide the program to the user, but also configured by a recording medium or the like which is provided to the user in a state in which the recording medium is incorporated in the device main body in advance.

In the present specification, the step of writing the program recorded on the recording medium includes not only processing performed in time series along the order but also processing performed in parallel or individually, even though the processing is not necessarily performed in time series. In addition, in the present specification, the term "system" is intended to mean an overall device composed of a plurality of devices, a plurality of means, and the like.

In other words, the electronic device to which the present invention is applied can take various embodiments having the following configurations. It suffices if an electronic device (for example, the functional module 3 of FIG. 1) to which the present invention is applied, including at least a portion of a constant current circuit network connected to a predetermined load, includes a control unit (for example, the control unit CT of FIG. 3) configured to control an applied voltage to the predetermined load based on a state relating to the predetermined load.

Here, the electronic device includes a path (for example, the path from the end K1 to the end K3 via the constant voltage diode D1 of FIG. 3) in which at least a portion of a voltage to be applied to the predetermined load is generated when a constant current flowing in the constant current circuit network flows therein; and a switch unit (for example, the field effect transistor Q1 of FIG. 3) configured to switch between short-circuit of the path and release of the short-circuit of the path, and the control unit controls the applied voltage to the predetermined load by switching the state of the switch unit. Thus, in a case of supplying power in a two-wire system, it is possible to suppress the power consumption at the load. It is also possible to achieve a low power consumption of a circuit connected to the constant current circuit network.

Here, in relation to the electronic device, a module (for example, the functional module 3 of FIG. 1) including the predetermined load and the electronic device is included in the constant current circuit network (for example, the circuit K of FIG. 3), and, in a case in which, in the constant current circuit network, information for communication is transmitted as a first pulse which repeats high and low voltages at a first frequency, the control unit (for example, the control unit CT of FIG. 3), in the module, switches the state of the switch unit (for example, the field effect transistor Q1 of FIG. 3) at a second frequency higher than the first frequency, and controls the applied voltage to the predetermined load in a form of a second pulse which repeats high and low voltages at the second frequency. With such a configuration, under a situation where the pulse voltage associated with the switching of the state of the field effect transistor Q1 is mixed, it is possible to acquire only information for communication, and thus it is possible to reliably operate the information processing system with improved power supply efficiency described above.

Here, in relation to the electronic device (for example, the functional module 3 of FIG. 1), the control unit (for example, the control unit CT of FIG. 3) executes control for determining a duty ratio at the second pulse based on power required by the predetermined load. With such a configuration, it is possible to supply power corresponding to the power required for the operation of the load.

Here, in relation to the electronic device, a module (for example, the functional module 3 of FIG. 1) including the predetermined load and the electronic device is included in the constant current circuit network, the electronic device further comprises a first detecting unit (for example, the comparator CM2 of FIG. 8) configured to detect a start of transmission of the information in the module, in a case in which information for communication is transmitted in the constant current circuit network, and the control unit (for example, the control unit CT of FIG. 8), in the module, switches the state of the switch unit (for example, the field effect transistor Q1 of FIG. 8) from a state of the short-circuit of the path to a state of the release of the short-circuit of the path when the start of transmission of the information is detected by the first detecting unit. With such a configuration, the state of the field effect transistor Q1 is not switched as much as possible, which makes it possible to eliminate an adverse effect on communication from the own functional module 3 or another functional module 3 to the core module 2. Here, the first detecting unit is, for example, the comparator CM2 of FIG. 8. However, this is merely an example, and the first detecting unit is not limited to the comparator. That is, any one capable of detecting the start of transmission in the module of the information for communication transmitted in the constant current circuit network can be adopted. For example, a combination of an A/D converter and a program determiner may be used.

Here, in relation to the electronic device, the control unit (for example, the control unit CT of FIG. 8), in the module (for example, the functional module 3 of FIG. 1), switches the state of the switch unit (for example, the field effect transistor Q1 of FIG. 8) from the state of the release of the short-circuit of the path to the state of the short-circuit of the path when an end of transmission of the information is recognized. With such a configuration, since the state of the field effect transistor Q1 is switched after the end of communication, it is possible to eliminate an adverse effect on the communication from the own functional module 3 or another functional module 3 to the core module 2.

Here, the electronic device further includes a second detecting unit configured to detect an end of transmission of the information in the module, in which the control unit (for example, the control unit CT of FIG. 8), in the module (for example, the functional module 3 of FIG. 1), switches the state of the switch unit (for example, the field effect transistor Q1 of FIG. 3) from the state of the release of the short-circuit of the path to the state of the short-circuit of the path when the end of transmission of the information is detected by the second detecting unit (for example, the comparator CM1 of FIG. 8). Here, the second detecting unit is, for example, the comparator CM1 of FIG. 8. However, this is merely an example, and the second detecting unit is not limited to the comparator. That is, any one capable of detecting the end of transmission in the module of the information for communication transmitted in the constant current circuit network can be adopted. For example, a combination of an A/D converter and a program determiner may be used. Furthermore, the first detecting unit may also serve as the second detecting unit (for example, the comparator CM2 of FIG. 8). In this example, it is unnecessary to separately provide the second detecting unit (for example, the comparator CM1 of FIG. 8). With such a configuration, since the state of the field effect transistor Q1 is switched after the end of communication, it is possible to eliminate an adverse effect on the communication from the own functional module 3 or another functional module 3 to the core module 2.

Here, in relation to the electronic device,
the control unit (e.g., the control unit CT of FIG. 8) is configured to, in the module (e.g. functional module 3 of FIG. 1),
not switch the state of the switch unit (for example, the field effect transistor Q1 of FIG. 8) and maintain the state of release of short-circuit of the path until the end of transmission of the information is recognized, and
switch the state of the switch unit (for example, the field effect transistor Q1 of FIG. 8, for example) from the state of release of short-circuit of the path to the state of short-circuit of the path when the end of transmission of the information is recognized. With such a configuration, since the state of the field effect transistor Q1 is switched after the end of communication, it is possible to eliminate an adverse effect on the communication from the own functional module 3 or another functional module 3 to the core module 2.

Here, the electronic device further includes a second detecting unit for detecting the end of transmission of the information in the module, and
the control unit (e.g., the control unit CT of FIG. 8) is configured to, in the module (e.g. functional module 3 of FIG. 1),
not switch the state of the switch unit (for example, the field effect transistor Q1 of FIG. 8) and maintain the state of release of short-circuit of the path until the end of transmission of the information is detected by the second detecting unit (for example, the comparator CM1 of FIG. 8), and
switch the state of the switch unit (for example, the field effect transistor Q1 of FIG. 3, for example) from the state of release of short-circuit of the path to the state of short-circuit of the path when the end of transmission of the information is detected by the second detecting unit (for example, the comparator CM1 of FIG. 8). Here, the second detecting unit is, for example, the comparator CM1 of FIG. 8. However, this is merely an example, and is not limited to the comparator. That is, any one capable of detecting the end of transmission, in the module, of the information for communication to be transmitted in the constant current circuit network can be adopted. For example, a combination of an A/D converter and a program determiner may be used. Furthermore, the first detecting unit may also serve as a second detecting unit (for example, the comparator CM2 of FIG. 8). In this case, it is unnecessary to separately provide the second detecting unit (for example, the comparator CM1 of FIG. 8). With such a configuration, since the state of the field effect transistor Q1 is switched after the end of communication, it is possible to eliminate an adverse effect on the communication from the own functional module 3 or another functional module 3 to the core module 2.

EXPLANATION OF REFERENCE NUMERALS

1 . . . user terminal,
2 . . . basic core,
3 . . . functional module,
BT . . . short-range wireless communication unit,
BU . . . battery unit,
C1 . . . capacitor,
C2 . . . capacitor,
CT . . . control unit,
D1 . . . constant voltage diode,
D2 . . . Schottky barrier diode,
DR . . . drain,
GT . . . gate,
K . . . circuit portion,
K1 . . . end,
K2 . . . end,
K3 . . . end,
K4 . . . end,
PP . . . battery unit,
PS1 . . . serial port,
PS2 . . . serial port,
PS3 . . . serial port,
Q1 . . . field effect transistor,
R1 . . . current measuring resistor,
SC . . . source,
SP1 . . . serial port,
SP2 . . . serial port,
T . . . tire,
VM . . . input circuit negative terminal,
VP . . . input circuit positive terminal

The invention claimed is:

1. An electronic device including at least one of a plurality of individual modules in a system that realizes a predetermined function in cooperation with various hardware and various software of the plurality of individual modules that perform power line communication superimposing information for communication, the electronic device comprising:
a constant current circuit network connected to a predetermined load, provided in one of the modules;
a path in which at least a portion of an applied voltage applied to the predetermined load is generated when a current flows in the constant current circuit network;
a switch unit configured to switch between short-circuit of the path and release of the short-circuit of the path; and
a control unit configured to switch, in a case in which, in the constant current circuit network, the information for communication is transmitted to at least one other module as a first pulse which repeats high and low voltages at a first frequency, a state of the switch unit at a second frequency higher than the first frequency, and control the applied voltage to the predetermined load in a form of a second pulse which repeats high and low voltages at the second frequency, in the one other module,
wherein the control unit is configured to switch the state of the switch unit to a state of the short-circuit when a potential of the path is higher than a prescribed voltage, and switch the state of the switch unit to a state of the release of the short-circuit when the potential of the path is lower than a prescribed voltage.

2. The electronic device according to claim 1, wherein the control unit executes control for determining a duty ratio at the second pulse based on power required by the predetermined load.

3. An electronic device including at least one of a plurality of individual modules in a system that realizes a predetermined function in cooperation with various hardware and various software of the plurality of individual modules that perform power line communication superimposing information for communication, the electronic device comprising:
a constant current circuit network connected to a predetermined load, provided in one of the modules;

a path in which at least a portion of an applied voltage applied to the predetermined load is generated when a current flows in the constant current circuit network;

a switch unit configured to switch between short-circuit of the path and release of the short-circuit of the path, a first detecting unit configured to detect a start of transmission of the information in the module based on a first voltage corresponding to level of current, in a case in which the information for communication is transmitted to at least one other module in the constant current circuit network, and a control unit configured to switch, in the module, a state of the switch unit to a state of the short-circuit when a potential of the path is higher than a prescribed voltage, and switch the state of the switch unit to a state of the release of the short-circuit after the start of transmission of the information for communication is detected by the first detecting unit when the potential of the path is lower than a prescribed voltage.

4. The electronic device according to claim 3, wherein the control unit, in the module, switches the state of the switch unit from the state of the release of the short-circuit of the path to the state of the short-circuit of the path when an end of transmission of the information for communication is recognized based on a second voltage corresponding to level of current.

5. The electronic device according to claim 3, further comprising a second detecting unit configured to detect an end of transmission of the information for communication in the module based on a second voltage corresponding to level of current, wherein the control unit, in the module, switches the state of the switch unit from the state of the release of the short-circuit of the path to the state of the short-circuit of the path when the end of transmission of the information for communication is detected by the second detecting unit.

* * * * *